(12) United States Patent
Connor et al.

(10) Patent No.: US 12,449,468 B2
(45) Date of Patent: Oct. 21, 2025

(54) ENHANCED RESOLUTION TIME-DOMAIN REFLECTOMETRY

(71) Applicant: International Business Machines Corporation, Armonk, NY (US)

(72) Inventors: Samuel R. Connor, Apex, NC (US); Matteo Cocchini, New York, NY (US); Matthew Doyle, Chatfield, MN (US); Stuart Brett Benefield, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 18/341,047

(22) Filed: Jun. 26, 2023

(65) Prior Publication Data

US 2024/0426893 A1    Dec. 26, 2024

(51) Int. Cl.
*G01R 31/11*    (2006.01)
*G01R 31/08*    (2020.01)

(52) U.S. Cl.
CPC ............ *G01R 31/11* (2013.01); *G01R 31/085* (2013.01)

(58) Field of Classification Search
CPC .............................. G01R 31/11; G01R 31/085
See application file for complete search history.

(56) References Cited

U.S. PATENT DOCUMENTS 5,128,619 A    7/1992    Bjork et al.
6,856,936 B1    2/2005    Chen et al.
(Continued)

FOREIGN PATENT DOCUMENTS

CN    202841101 U    3/2013
CN    109946583 A    6/2019
(Continued)

OTHER PUBLICATIONS

International Search Report; International Application No. PCT/IB2024/052810; International Filing Date: Mar. 24, 2024; Date of mailing: Aug. 29, 2024; 7 pages.
(Continued)

*Primary Examiner* — Feba Pothen
(74) *Attorney, Agent, or Firm* — CANTOR COLBURN LLP; Matt Zehrer

(57) ABSTRACT

Computer-implemented methods for performing enhanced resolution time-domain reflectometry are provided. Aspects include obtaining a plurality of waveforms by transmitting a first pulse on a transmission line, transmitting a second pulse on the transmission line, where the second pulse is transmitted after the first pulse by a delay, and capturing and measuring reflections of the transmitted pulses, wherein the delay corresponding to each of the plurality of waveforms is different. Aspects also include identifying a discontinuity of the transmission line based at least in part on the plurality of waveforms. Based on a determination that the transmission line includes the discontinuity, aspects include calculating third derivative curves for each of the plurality of waveforms and calculating a length of the discontinuity of the transmission line based on the third derivative curves. Aspects also include creating a notification indicating a location and the length of the discontinuity of the transmission line.

21 Claims, 10 Drawing Sheets

(56) References Cited

U.S. PATENT DOCUMENTS

| | | |
|---|---|---|
| 7,965,941 B2 | 6/2011 | Conroy et al. |
| 9,210,257 B2 | 12/2015 | Hall et al. |
| 10,732,215 B2 | 8/2020 | Park et al. |
| 10,732,222 B2 | 8/2020 | Peschke et al. |
| 11,105,879 B1 | 8/2021 | Cao et al. |
| 11,621,884 B2 | 4/2023 | Chappell et al. |
| 2006/0152404 A1 | 7/2006 | Fullerton et al. |
| 2008/0123771 A1 | 5/2008 | Cranford et al. |
| 2010/0176815 A1 | 7/2010 | Roth |
| 2017/0023632 A1* | 1/2017 | Johnson ............... G01R 31/11 |
| 2019/0079131 A1 | 3/2019 | Pinhasi et al. |
| 2021/0285998 A1 | 9/2021 | Alkaraghouli et al. |
| 2021/0311118 A1 | 10/2021 | Podolski et al. |
| 2022/0326287 A1 | 10/2022 | Campbell et al. |
| 2022/0357237 A1 | 11/2022 | Tan |
| 2023/0099415 A1 | 3/2023 | Yosra |

FOREIGN PATENT DOCUMENTS

| | | | |
|---|---|---|---|
| JP | H09138264 A | * | 5/1997 |
| WO | 2025/003776 A1 | | 1/2025 |

OTHER PUBLICATIONS de Oliveira et al.; "Analysis Of Typical PLC Pulses For Sensing High-Impedance Faults Based On Time-Domain Reflectometry", IJEPES Journal Of, vol. 135, Feb. 26, 2021, pp. 1-14.

Fornas et al.; "Modeling And Simulation Of Time Domain Reflectometry Signals On A Real Network For use In Fault Classification And Location", IEEE Access, vol. 11, Mar. 6, 2023, pp. 23596-23619.

Liu et al.; "Advances In Phase-Sensitive Optical Time-Domain Reflectometry", Opto-Electronic Advances, vol. 5, No. 3, Mar. 15, 2022, pp. 200078-1 to 200078-28.

Scarpetta et al.; "Detection And Characterization Of Multiple Discontinuities In Cables With Time-Domain Reflectometry And Convolutional Neural Networks", Sensors, vol. 21, Iss. 23, Dec. 1, 2021, pp. 1-13.

Xu et al.; "A High-Perfomance, Reconfigurable, Fully Integrated Time-domain Reflectometry Architecture Using Digital I/Os", Tim IEEE Transactions On, vol. 70, Feb. 19, 2021, pp. 1-9.

* cited by examiner

ENHANCED RESOLUTION TIME-DOMAIN REFLECTOMETRY

BACKGROUND

The present disclosure generally relates to time-domain reflectometry, and more specifically, to methods and systems for performing enhanced resolution time-domain reflectometry.

Time domain reflectometry is a technique used in electronics and telecommunications to measure and analyze the characteristics of transmission lines, cables, and other electrical components. It is particularly useful for determining the location and nature of faults or disruptions in these components. The principle behind time domain reflectometry is based on the measurement of reflections that occur when an electrical pulse is transmitted along a conductor or transmission line. When the pulse encounters a change in impedance, such as a fault, an open circuit, or a termination, part of the pulse is reflected back towards the source. By analyzing the time delay and magnitude of these reflections, valuable information about the electrical properties of the transmission line can be obtained.

In general, time-domain reflectometry involves sending a short electrical pulse along the conductor or transmission line being tested. The reflected pulses are then captured and measured using a high-speed sampling system. By analyzing the time difference between the transmitted and reflected pulses, the distance to the fault or impedance change can be calculated. Additionally, the amplitude and shape of the reflected pulses can provide insights into the nature and severity of the impedance discontinuity.

Time domain reflectometry is commonly used in various applications, including the testing and troubleshooting of cables, connectors, printed circuit boards, and other components used in telecommunications, networking, power distribution, and industrial systems. It allows for quick and accurate identification of faults, such as open circuits, short circuits, impedance mismatches, cable breaks, or water ingress.

While time-domain reflectometry is a valuable tool for characterizing and diagnosing the integrity and performance of electrical systems, currently available time-domain reflectometry systems have limited resolutions which limit the ability to detect discontinuities that are shorter (in propagation time) than the rise time of the TDR pulse.

SUMMARY

Embodiments of the present disclosure are directed to computer-implemented methods for performing enhanced resolution time domain reflectometry. According to an aspect, a computer-implemented method includes obtaining a plurality of waveforms by transmitting a first pulse on a transmission line, transmitting a second pulse on the transmission line, where the second pulse is transmitted after the first pulse by a delay, and capturing and measuring reflections of the transmitted pulses, wherein the delay corresponding to each of the plurality of waveforms is different. The method also includes identifying a discontinuity of the transmission line based at least in part on the plurality of waveforms. Based on a determination that the transmission line includes the discontinuity, the method also includes calculating third derivative curves for each of the plurality of waveforms and calculating a length of the discontinuity of the transmission line based on the third derivative curves. The method further includes creating a notification indicating a location and the length of the discontinuity of the transmission line.

In addition to one or more of the features described herein, the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

In addition to one or more of the features described herein, the length of the discontinuity is calculated by dividing the associated delay of the identified third derivative curve by two and multiplying it by the propagation velocity of the first pulse.

In addition to one or more of the features described herein, a trained machine learning system is configured to identify the third derivative curve from the third derivative curves that has the minimum peak-to-peak amplitude in the location of the discontinuity.

Embodiments of the present disclosure are directed to a computing system having a memory having computer readable instructions and one or more processors for executing the computer readable instructions. The computer readable instructions controlling the one or more processors to perform operations including obtaining a plurality of waveforms by transmitting a first pulse on a transmission line, transmitting a second pulse on the transmission line, where the second pulse is transmitted after the first pulse by a delay, and capturing and measuring reflections of the transmitted pulses, wherein the delay corresponding to each of the plurality of waveforms is different. The operations also include identifying a discontinuity of the transmission line based at least in part on the plurality of waveforms. Based on a determination that the transmission line includes the discontinuity, the operations include calculating third derivative curves for each of the plurality of waveforms and calculating a length of the discontinuity of the transmission line based on the third derivative curves. The operations also include creating a notification indicating a location and the length of the discontinuity of the transmission line.

In addition to one or more of the features described herein, the determination that the transmission line includes the discontinuity is based on determining that the plurality of waveforms have a point at which the waveforms transition from flat to having a positive slope.

In addition to one or more of the features described herein, the calculating the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

In addition to one or more of the features described herein, the length of the discontinuity is calculated by dividing an associated delay of the identified third derivative curve by two and multiplying it by the propagation velocity of the first pulse.

Embodiments of the present disclosure are directed to a computer program product comprising a computer readable storage medium having program instructions embodied therewith. The program instructions executable by a processor to cause the processor to perform operations including obtaining a plurality of waveforms by transmitting a first pulse on a transmission line, transmitting a second pulse on the transmission line, where the second pulse is transmitted after the first pulse by a delay, and capturing and measuring reflections of the transmitted pulses, wherein the delay corresponding to each of the plurality of waveforms is different. The operations also include identifying a discontinuity of the transmission line based at least in part on the plurality of waveforms. Based on a determination that the transmission line includes the discontinuity, the operations include calculating third derivative curves for each of the plurality of waveforms and calculating a length of the discontinuity of the transmission line based on the third derivative curves. The operations also include creating a notification indicating a location and the length of the discontinuity of the transmission line.

In addition to one or more of the features described herein, the calculating the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

In addition to one or more of the features described herein, the length of the discontinuity is calculated by dividing an associated delay of the identified third derivative curve by two and multiplying it by the propagation velocity of the first pulse.

Embodiments of the present disclosure are directed to computer-implemented methods for performing enhanced resolution time domain reflectometry. According to an aspect, a computer-implemented method includes obtaining a plurality of waveforms by transmitting a first pulse on a transmission line, transmitting a second pulse on the transmission line, where the second pulse is transmitted after the first pulse by a delay, and capturing and measuring reflections of the transmitted pulses, wherein the delay corresponding to each of the plurality of waveforms is different. The method also includes calculating derivative curves for each of the plurality of waveforms, calculating a length of the discontinuity of the transmission line based at least in part on the derivative curves, and creating a notification indicating a location and the length of the discontinuity of the transmission line.

In addition to one or more of the features described herein, the derivative curves comprise third derivative curves.

Embodiments of the present disclosure are directed to computer-implemented methods for performing enhanced resolution time domain reflectometry. According to an aspect, a computer-implemented method includes a) transmitting a first pulse on a transmission line, b) transmitting a second pulse on the transmission line, where the second pulse is transmitted after the first pulse by a delay, and c) capturing and measuring reflections of the transmitted pulses to create a waveform. The method includes iteratively repeating steps a, b, and c using a plurality of different values for the delay to create a plurality of waveforms including the waveform. The method further includes identifying a discontinuity of the transmission line based at least in part on the plurality of waveforms. Based on a determination that the transmission line includes the discontinuity, the method includes calculating third derivative curves for each of the plurality of waveforms and calculating a length of the discontinuity of the transmission line based at least in part on the third derivative curves. The method also includes creating a notification indicating a location and the length of the discontinuity of the transmission line.

In addition to one or more of the features described herein, the determination that the transmission line includes the discontinuity is based on determining that the plurality of waveforms have a point at which the waveforms transition from flat to having a positive slope.

In addition to one or more of the features described herein, the calculating the length of the discontinuity of the transmission line includes identifying a third derivative curve from the third derivative curves that has a minimum peak-to-peak amplitude in a location of the discontinuity, wherein the length of the discontinuity is calculated based on an associated delay of the identified third derivative curve.

In addition to one or more of the features described herein, the length of the discontinuity is calculated by dividing an associated delay of the identified third derivative curve by two and multiplying it by the propagation velocity of the first pulse.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
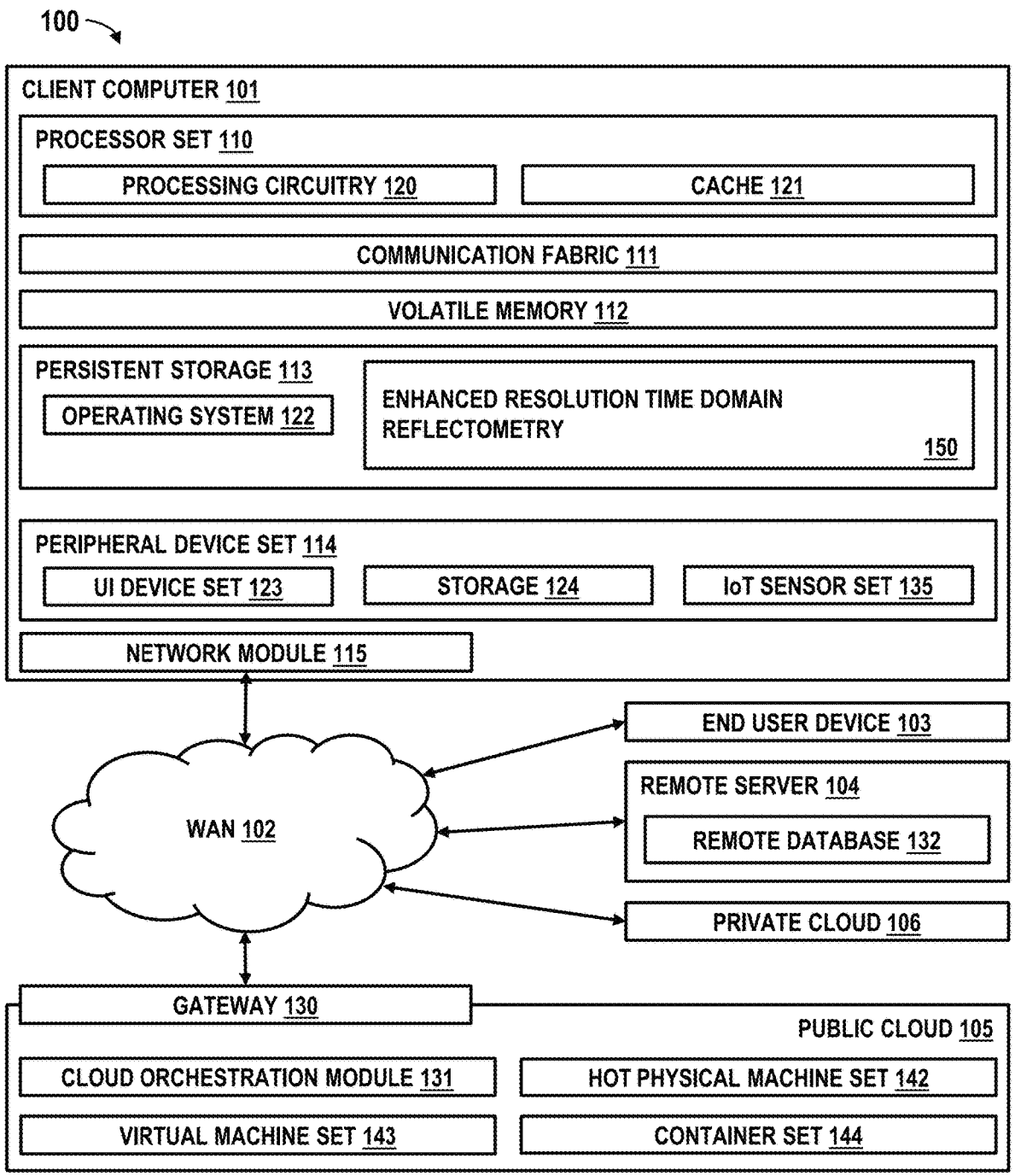
FIG. 1 depicts a block diagram of an example computer system for use in conjunction with one or more embodiments of the present disclosure.

As discussed above, time domain reflectometry (TDR) is used to characterize the impedance of signal paths from a source to a load. TDR involves sending a short electrical pulse along the conductor or transmission line being tested. The reflected pulses are then captured and measured using a high-speed sampling system. By analyzing the time difference between the transmitted and reflected pulses, the distance to the fault or impedance change can be calculated. In general, time-domain reflectometers are limited in their resolution by the rise time of their pulse generator. That is, discontinuities on a transmission line, that are shorter in electrical length than the rise time cannot be reliably detected by current time domain reflectometers.

The current state-of-the-art pulse generators used in TDR have rise times of approximately 5-15 picoseconds (ps). In addition, due to dispersion along the transmission line, the length of the rise time will increase along the transmission line. In some printed circuit boards (PCBs) a typical propagation velocity is approximately 6.67 mils/ps (i.e., thousandths of an inch per picosecond). As a result, discontinuities on the PCBs that are shorter than 30 mils are difficult to resolve because the length of the discontinuity (30 mils) divided by the propagation velocity (6.67 mils/ps) is 4.5 ps, which is less than the rise time of 5 ps.

In exemplary embodiments, systems, and methods for performing enhanced resolution time domain reflectometry are provided. In exemplary embodiments, the enhanced resolution time domain reflectometry includes transmitting two separate pulses onto a transmission line with a controlled delay between the pulses. The reflected pulses are then captured and measured using a high-speed sampling system to create a waveform. In exemplary embodiments, a plurality of waveforms are generated with each waveform corresponding to a different delay period between the pulses. In exemplary embodiments, a location of a discontinuity in the transmission line can be identified based on an analysis of the plurality of waveforms. In one embodiment, a determination that the transmission line includes the discontinuity is based on determining that the plurality of waveforms have a point at which the waveforms transition from flat to having a positive slope.

In exemplary embodiments, derivative curves for each of the plurality of waveforms are created and analyzed to identify the location and a length of a discontinuity in the transmission line. In one embodiment, the derivative curves include first, second, and third derivative curves. In one embodiment, analysis of the third derivative curves is used to determine the length of a discontinuity in the transmission line. Once a location and length of a discontinuity in the transmission line have been determined, a notification including the location and the length of the discontinuity is created.

In exemplary embodiments, a time domain reflectometer is provided which overcomes the current limitations on identifying discontinuities that are shorter in electrical length than the rise time of a generated pulse. The time domain reflectometer overcomes this limitation by transmitting two separate pulses onto a transmission line with a controllable delay between the two pulses. The delay can be controlled via digital or analog means. The time domain reflectometer is configured to capture and measure a reflected waveform caused by the interaction of transmitted pulses and a discontinuity on the transmission line using a high-speed sampling system. By analyzing the time difference between the transmitted and reflected pulses, the distance to the discontinuity or impedance change can be calculated. In addition, the time domain reflectometer is configured to calculate the length of the discontinuity based on derivative curves of the reflected waveform.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as performing enhanced resolution time domain reflectometry 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 132, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as identifying a curve from a provided set of curves. Inference 204 is the process of implementing the trained model 218 to perform the task, such as identifying a curve from a provided set of curves, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes multiple sets of curves and a curve from each set that has the desired characteristics. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as identifying a curve from a provided set of curves. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
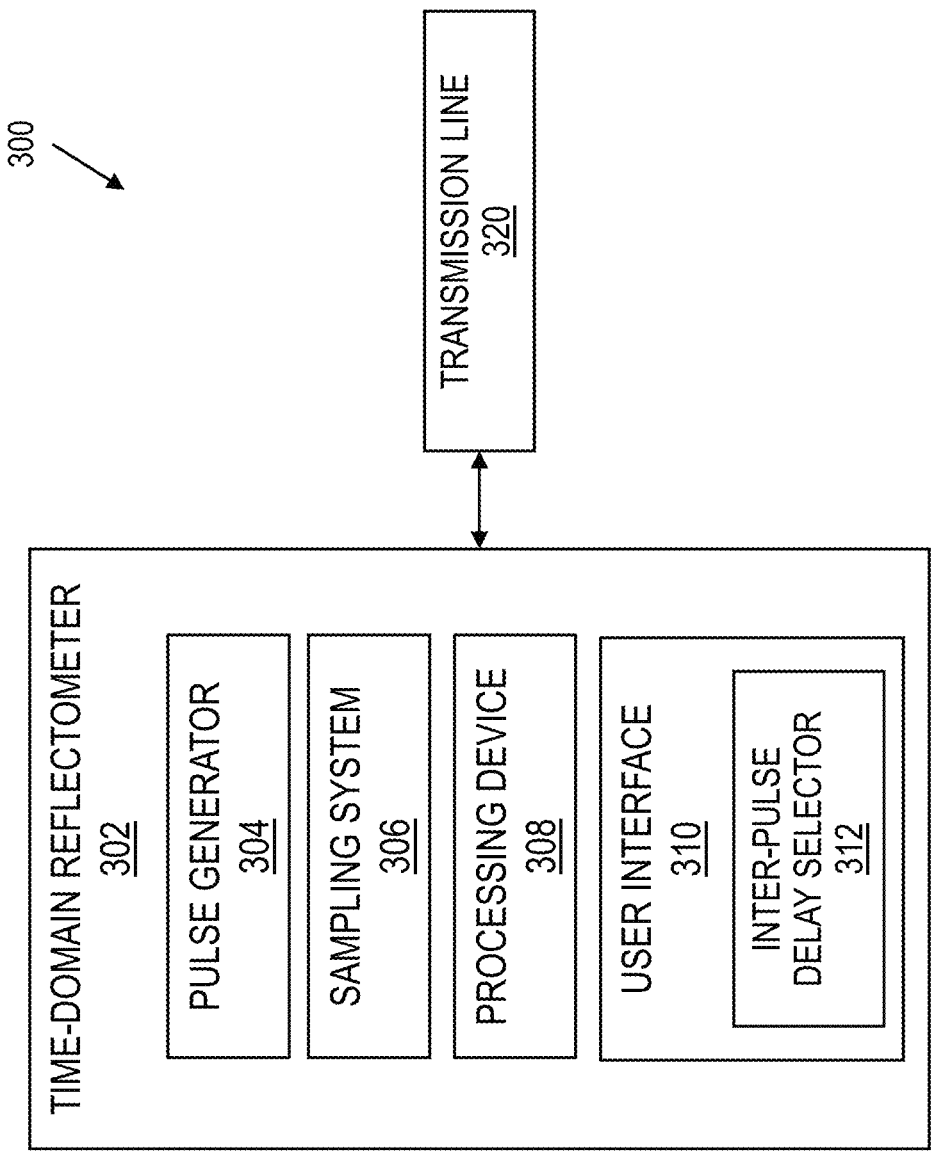
FIG. 3 depicts a block diagram of a system for performing enhanced resolution time domain reflectometry in accordance with one or more embodiments of the present disclosure.

Referring now to FIG. 3, a block diagram of a system 300 for performing enhanced resolution time domain reflectometry in accordance with one or more embodiments of the present disclosure is shown. As illustrated, the system 300 includes a time-domain reflectometer 302 that is connected to a transmission line 320. The time-domain reflectometer 302 is configured to perform measurements and analyze the characteristics of transmission lines or electrical components. The transmission line 320 can be any type of conductor, such as a coaxial cable, twisted pair, or printed circuit board trace.

In exemplary embodiments, the time-domain reflectometer 302 includes a pulse generator 304, a sampling system 306, a processing device 308, and a user interface 310. The pulse generator 304 is configured to generate short-duration electrical pulses, which serve as the test signal that is sent down the transmission line 322. The pulse generator 304 produces pulses having a fast rise time and well-defined shape for accurate measurements. In exemplary embodiments, the sampling system 306 is configured to capture and measure the reflections of the transmitted pulses. The sampling system 306 includes a fast analog-to-digital converter (ADC) and associated circuitry that samples the reflected waveform at high speeds to obtain accurate time-domain measurements.

In exemplary embodiments, the user interface 310 includes a user input device that that allows the operator to control the time-domain reflectometer 302 and a display that allows a user to interpret the results of the time-domain reflectometer 302. In one embodiment, the display presents the measured data to the user through one of a digital display showing the time-domain waveform, a graphical representation of the reflections, or a numerical readout indicating the distance to the fault. In one embodiment, the user interface 310 includes an inter-pulse delay selector 312 that allows the operator to control the delay between pulses. The user input device of the user interface 310, including the inter-pulse delay selector 312, can be in the form of buttons, knobs, a touchscreen, or a computer-based interface, depending on the specific time-domain reflectometer 302.

In exemplary embodiments, the specific time-domain reflectometer 302 includes a processing device 308 that is configured to provide analysis functions, such as automatic fault detection or waveform processing capabilities. In one embodiment, the processing device 308 controls the operation of the pulse generator 304 based on the input received from the user interface 310. The processing device 308 is configured to obtain the waveforms from the sampling system 306 and calculates derivative curves for each of the waveforms. The derivative curves can include first, second, and third derivative curves. The processing device 308 is further configured to analyze the derivative curves and to calculate a location and/or length of a discontinuity of the transmission line 320.

Figure 2:
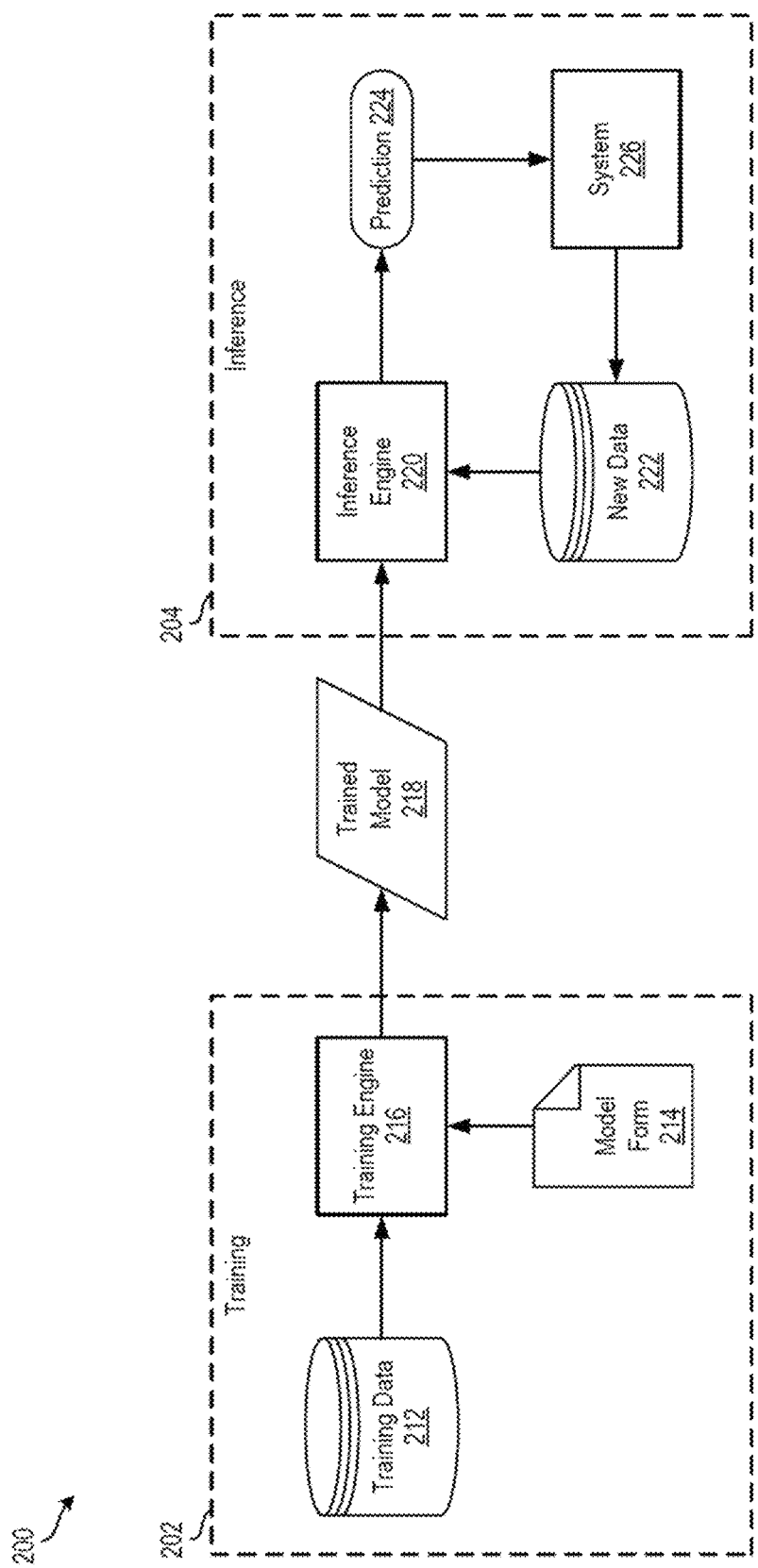
FIG. 2 depicts a block diagram of components of a machine learning training and inference system in accordance with one or more embodiments of the present disclosure.

In exemplary embodiments, the processing device 308 of the time-domain reflectometer 302 may be embodied in computer 101, such as the one shown in FIG. 1. The processing device 308 may also include, or alternatively be in communication with, a machine learning training and inference system 200 such as the one shown in FIG. 2, which is used for performing analysis on the derivative curves.

Figure 4:
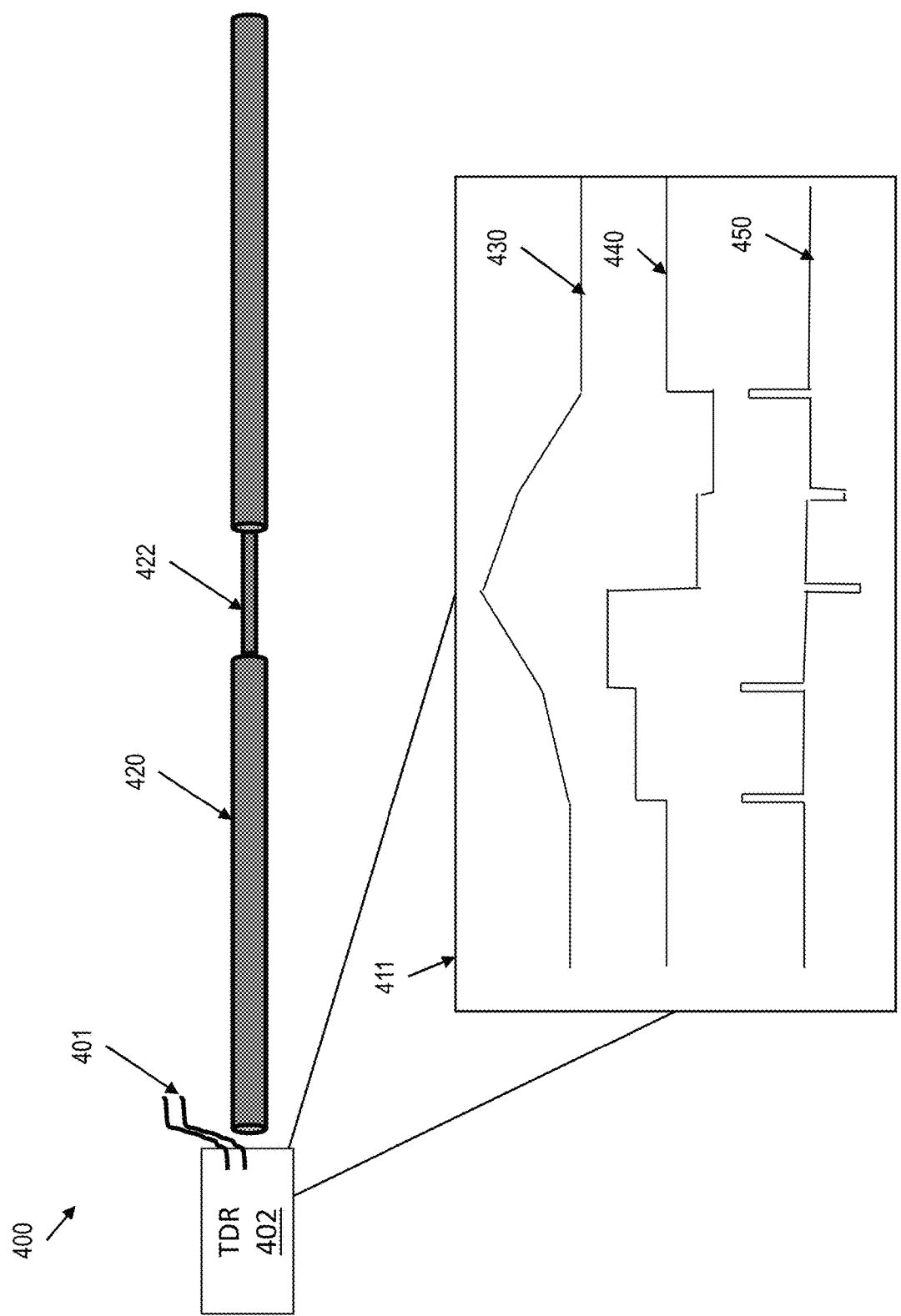
FIG. 4 depicts a schematic diagram of a system for performing enhanced resolution time domain reflectometry in accordance with one or more embodiments of the present disclosure.

Referring now to FIG. 4 a schematic diagram of a system 400 for performing enhanced resolution time domain reflectometry in accordance with one or more embodiments of the present disclosure is shown. As illustrated, the system 400 includes a time-domain reflectometer 402 that is configured to transmit pulses 401 onto a transmission line 420. The transmission line 420 includes a discontinuity 422 that affects the impedance of the transmission line 420. In one embodiment, the time-domain reflectometer 402 is configured to create, and optionally display, a waveform 430 of the reflected pulses 401 on a display 411. In addition, the time-domain reflectometer 402 is configured to create, and optionally display, a first derivative curve 440 and a second derivative curve 450 of the waveform 430 on display 411. In addition, the time-domain reflectometer 402 may create and display a third derivative curve (not shown) of the waveform 430 on display 411.

In exemplary embodiments, the time-domain reflectometer 402 creates and saves a plurality of reflected waveforms and their derivative curves, where each waveform and associated derivative curves correspond to a different period of delay between the transmission of the pulses 401. In exemplary embodiments, the time-domain reflectometer 402 is configured to calculate a location and a length of the discontinuity 422 of the transmission line 420 based on an analysis of the plurality of reflected waveforms and their derivative curves.

Figure 5:
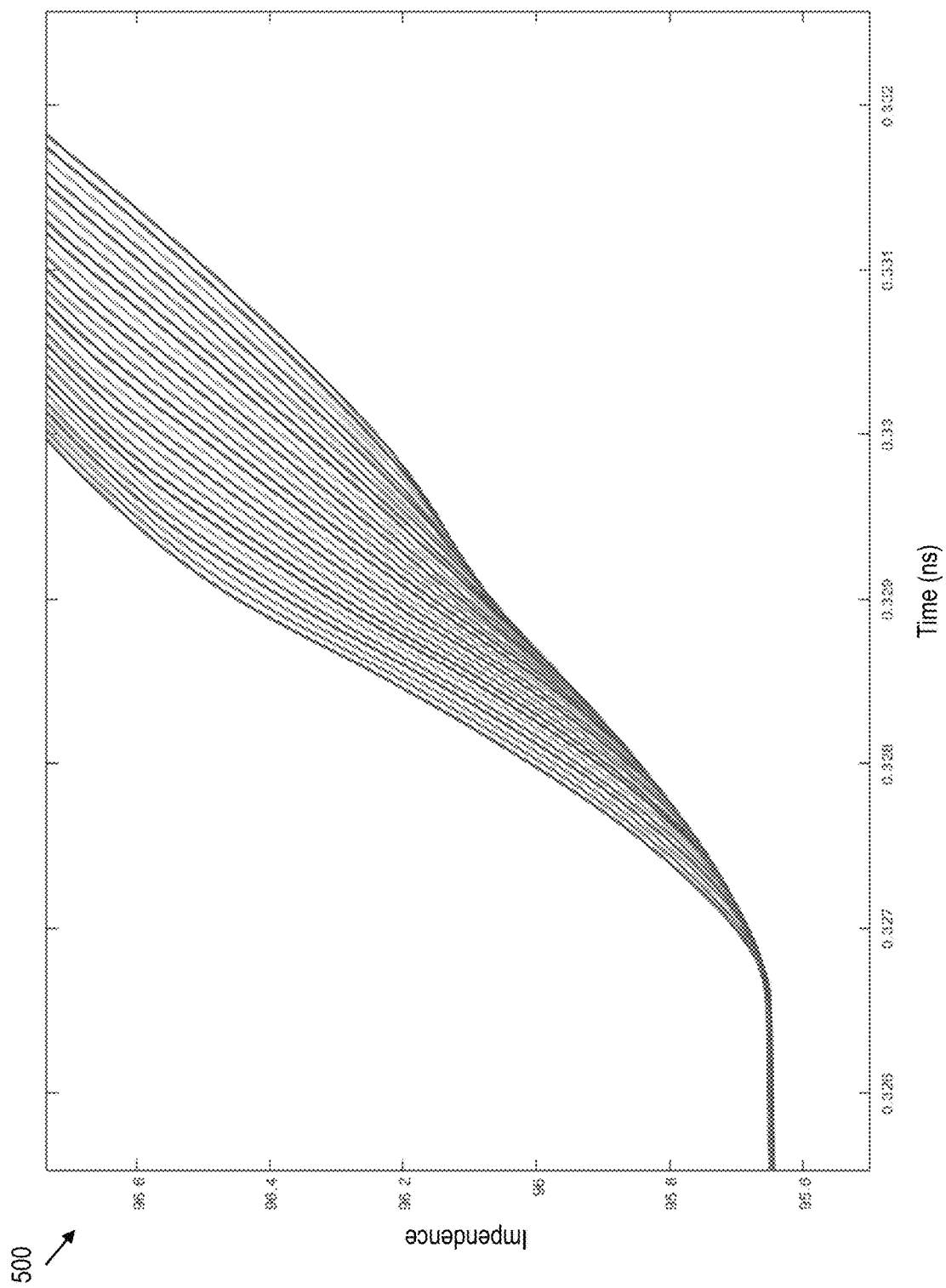
FIG. 5 is a graph depicting a plurality of reflected waveforms for a transmission line with a discontinuity in accordance with one or more embodiments of the present disclosure.

Referring now to FIG. 5 a graph 500 depicting a plurality of reflected waveforms for a transmission line with a discontinuity in accordance with one or more embodiments of the present disclosure is shown. Each of the plurality of reflected waveforms corresponds to a different delay period between the transmitted pulses. As illustrated in graph 500 all of the curves have a generally flat slope until a time of approximately 0.3265 nanoseconds (ns). Based on this data point, the location or starting point of a discontinuity can be calculated by dividing the 0.3265 ns by two (to account for the round-trip time of the pulse and its reflection) and multiplying the result by the propagation velocity of the pulses transmitted on the transmission line.

In exemplary embodiments, the delay between the first pulse and the second pulse will create destructive interference between the reflection of the first pulse and the second pulse. In one embodiment, the duration of a delay, referred to herein as an identified delay, that causes the reflection of the first pulse to completely cancel out the second pulse can be used to calculate the length of the discontinuity on the transmission line. The length of the discontinuity on the transmission line can be calculated by dividing the identified delay by two and multiplying it by the propagation velocity of the first pulse.

Figure 6:
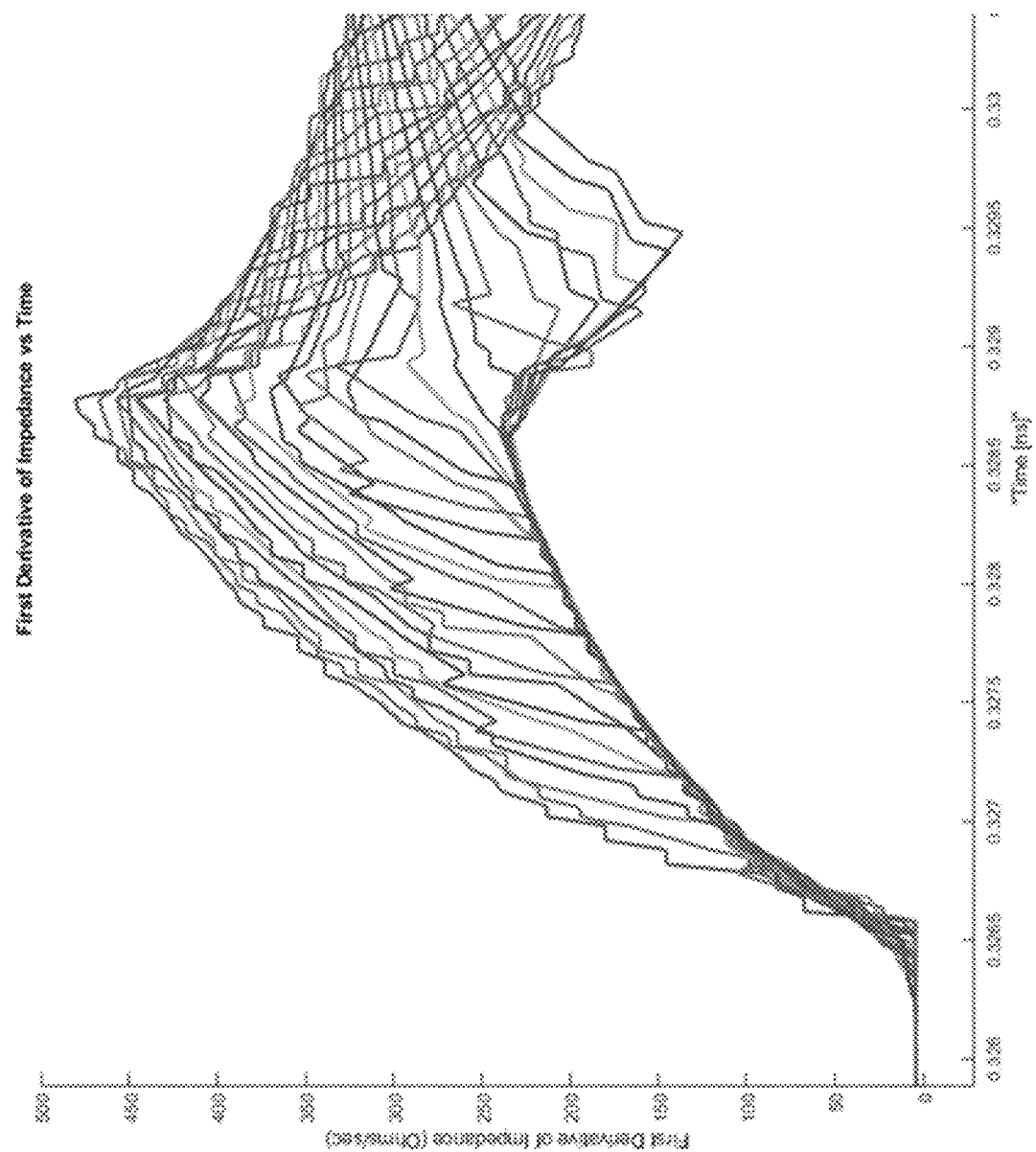
FIG. 6 is a graph depicting a plurality of first derivative curves of the reflected waveforms in FIG. 5 in accordance with one or more embodiments of the present disclosure.

Referring now to FIG. 6 a graph 600 depicting a plurality of first derivative curves of the reflected waveforms in FIG. 5 in accordance with one or more embodiments of the present disclosure is shown. Each of the plurality of first derivative curves corresponds to a different delay period between the transmitted pulses. As illustrated in graph 600 all of the curves have a generally flat slope until a time of approximately 0.3265 nanoseconds (ns). Based on this data point, the location or starting point of a discontinuity can be calculated by dividing the 0.3265 ns by two (to account for the round-trip time of the pulse and its reflection) and multiplying the result by the propagation velocity of the pulses transmitted on the transmission line. As shown in graph 600 the identified delay is approached and then exceeded (in the circled portion of the graph), the curves change from increasing in slope to decreasing in slope. In one embodiment, a curve having the exact identified delay would have no change in slope in the circled area.

Figure 7:
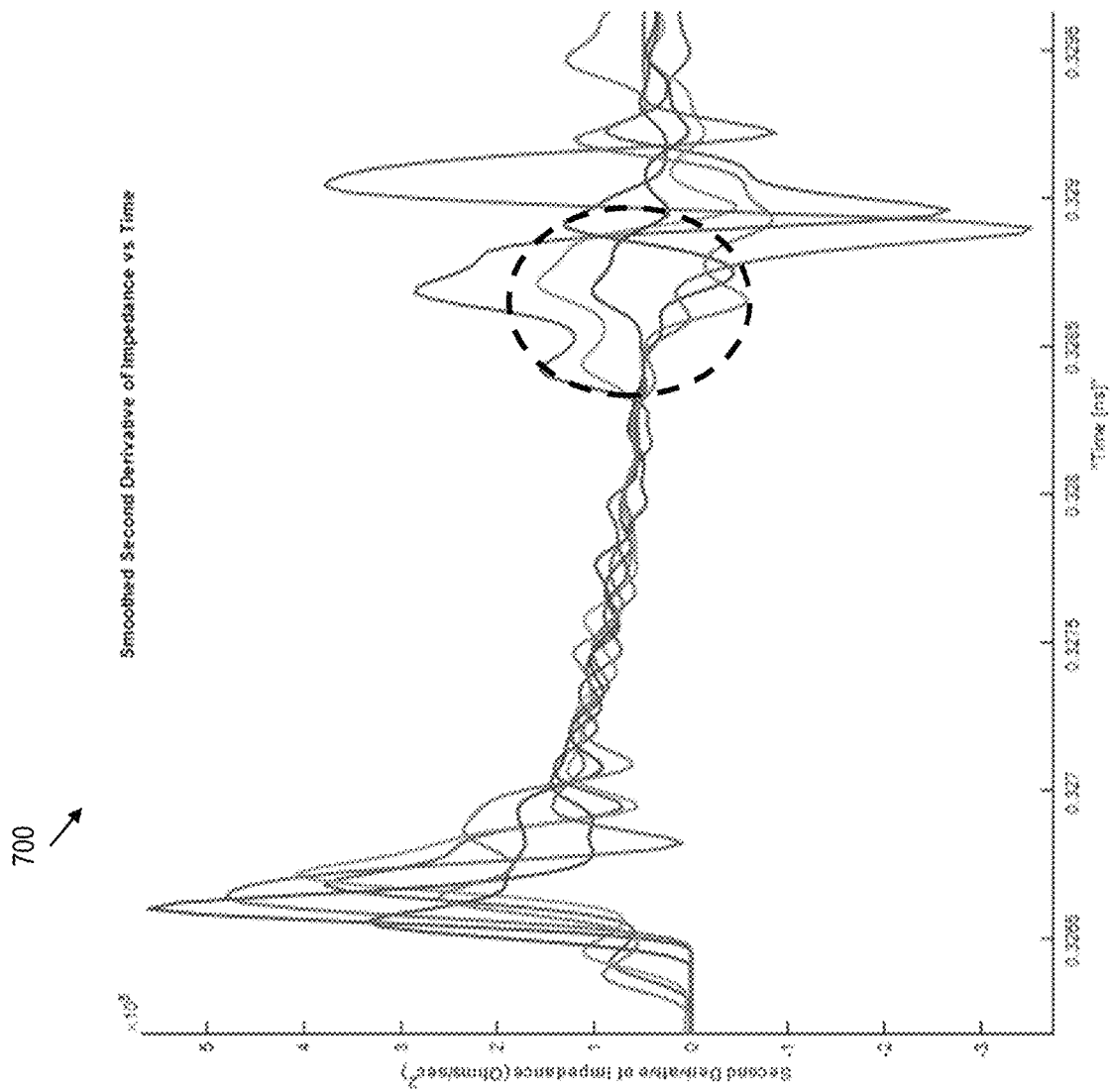
FIG. 7 is a graph depicting a plurality of second derivative curves of the reflected waveforms in FIG. 5 in accordance with one or more embodiments of the present disclosure.

Referring now to FIG. 7 a graph depicting a plurality of second derivative curves of the reflected waveforms in FIG. 5 in accordance with one or more embodiments of the present disclosure is shown. Each of the plurality of first derivative curves corresponds to a different delay period between the transmitted pulses. As illustrated in graph 700, as the identified delay is approached and then exceeded (in the circled portion of the graph), the curves change from positive spikes to negative spikes. In one embodiment, a curve having the identified delay would have no spike in the circled area.

Figure 8:
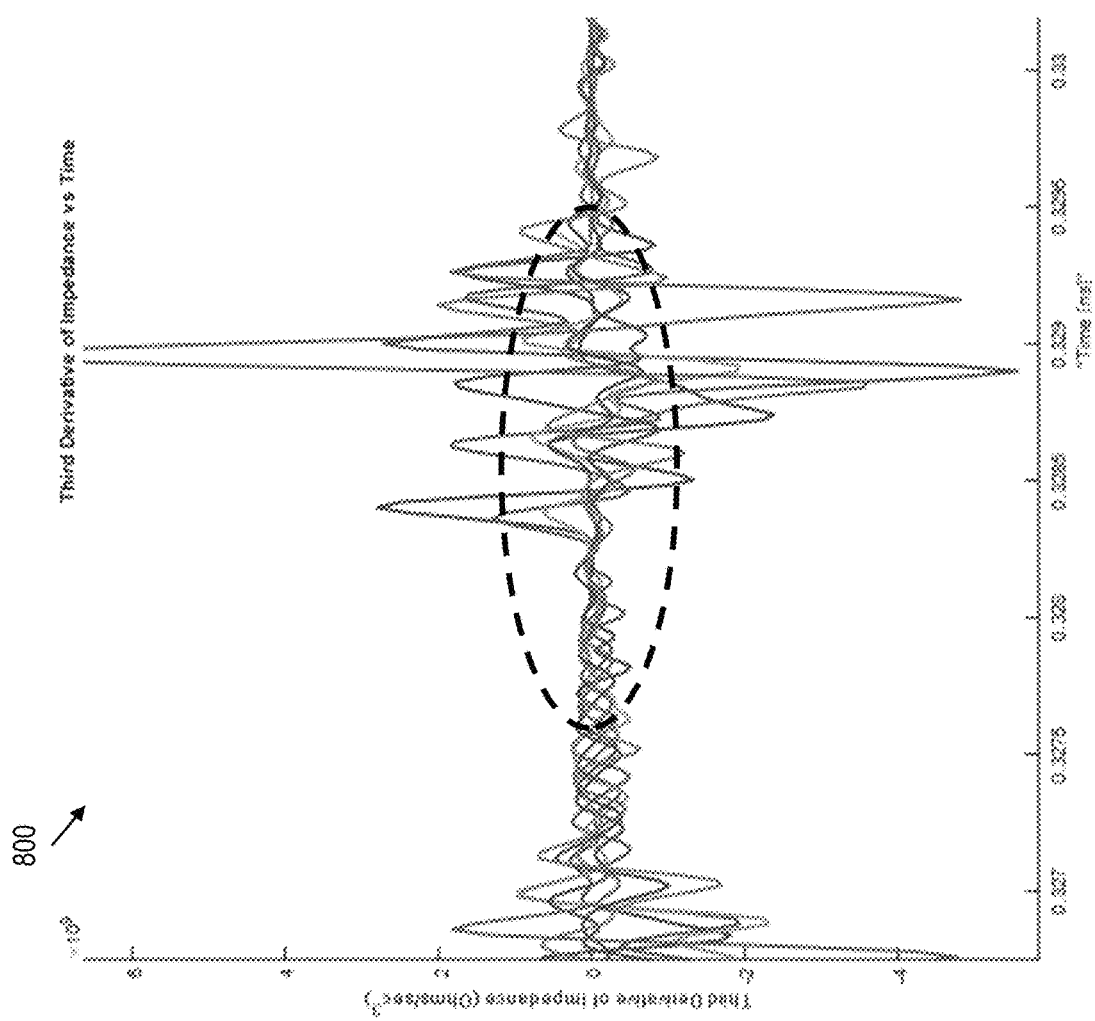
FIG. 8 is a graph depicting a plurality of third derivative curves of the reflected waveforms in FIG. 5 in accordance with one or more embodiments of the present disclosure.

Referring now to FIG. 8 a graph depicting a plurality of third derivative curves of the reflected waveforms in FIG. 5 in accordance with one or more embodiments of the present disclosure is shown. Each of the plurality of first derivative curves corresponds to a different delay period between the transmitted pulses. As illustrated in graph 700, as the identified delay is approached and then exceeded (as shown in the circled portion of the graph), the peak-to-peak magnitude of the curves decreases to a minimum and then starts increasing again. In one embodiment, the identified delay is determined to be the delay that corresponds to the curve that yields the minimum peak-to-peak change in amplitude.

In exemplary embodiments, the identification of the curve that yields the minimum peak-to-peak change amplitude, i.e., the determination of the identified delay, may be performed using a trained machine learning system that is configured to select the proper curve from a provided set of third derivative curves of the reflected waveforms.

In another embodiment, the third derivative curve is displayed on a user interface of the time domain reflectometer and a user manually adjusts the delay using an input device, such as a dial. Once the user determines that the displayed third derivative curve has a minimum peak-topeak amplitude change, the corresponding delay of the third derivative curve is determined to be the identified delay.

Figure 9:
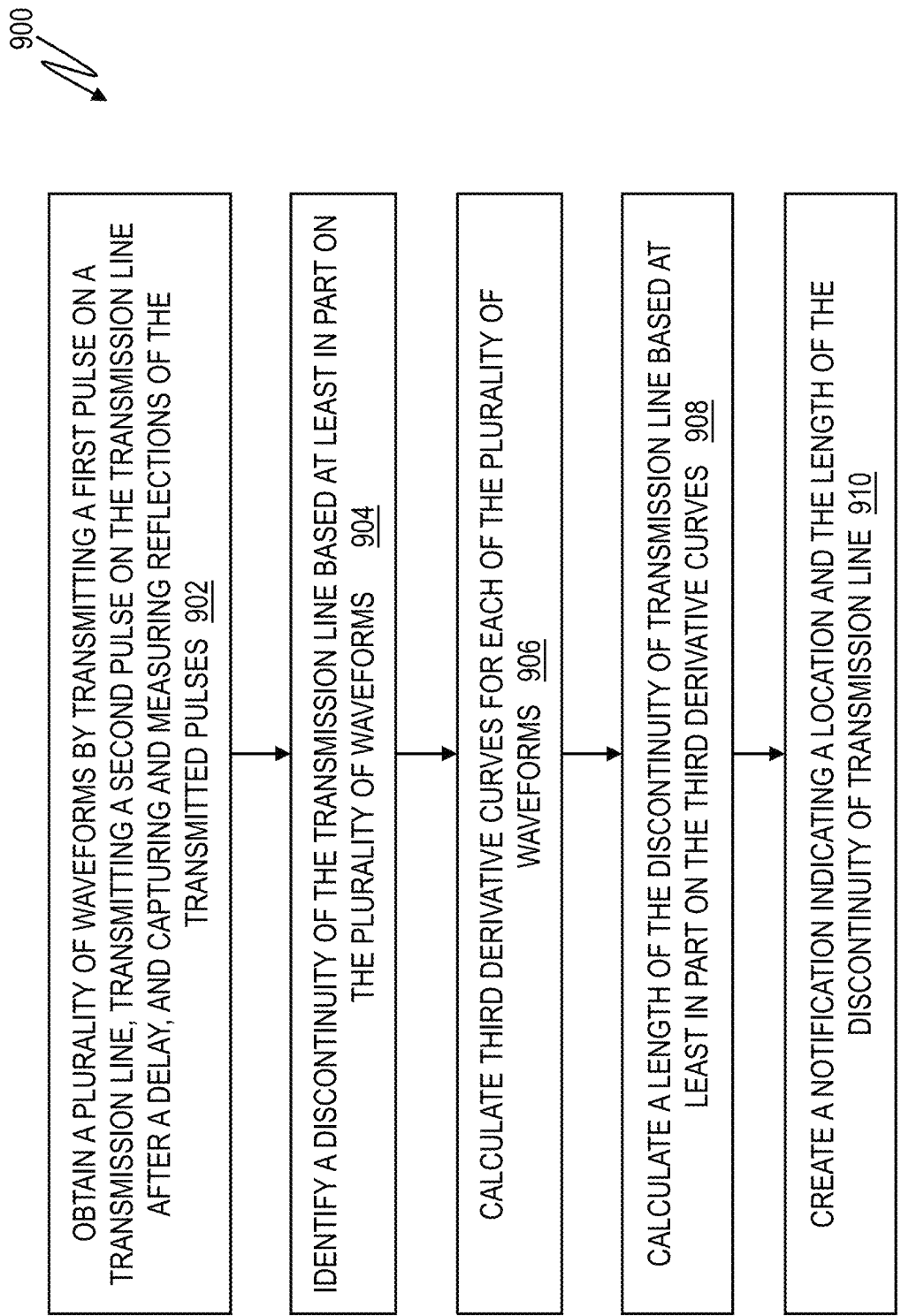
FIG. 9 depicts a flowchart of a method for performing enhanced resolution time domain reflectometry in accordance with one or more embodiments of the present disclosure.

Referring now to FIG. 9 a flowchart of a method 900 for performing enhanced resolution time domain reflectometry in accordance with one or more embodiments of the present disclosure is shown. In exemplary embodiments, the method 900 is performed by a time-domain reflectometer such as the one shown in FIG. 3

At block 902, the method 900 includes obtaining a plurality of waveforms by transmitting a first pulse on a transmission line, transmitting a second pulse on the transmission line after a delay, and capturing and measuring reflections of the transmitted pulses. In exemplary embodiments, each of the plurality of waveforms corresponds to a different delay value selected from a range of values for the delay. The range of the delay values is specified by a user of the time-domain reflectometer. In exemplary embodiments, the user may also specify a step size of the delay values that will be tested. In one embodiment, the delay values between the transmitted pulses are digitally controlled by the time-domain reflectometer. In another embodiment, the time-domain reflectometer may use analog devices to control delay values between the transmitted pulses.

At block 904, the method 900 includes identifying a discontinuity of the transmission line based at least in part on the plurality of waveforms. In one embodiment, a determination that the transmission line includes the discontinuity is based on determining that the plurality of waveforms have a point at which the waveforms transition from flat to having a positive slope. In exemplary embodiments, the location of the discontinuity is calculated by dividing a time associated with the point on the curve by two and multiplying it by the propagation velocity of the first pulse. As used herein, the location of the discontinuity refers to the starting point of the discontinuity on the transmission line.

At block 906, the method 900 includes calculating third derivative curves for each of the plurality of waveforms. Next, at block 908 the method 900 includes calculating the length of the discontinuity of the transmission line based at least in part on the third derivative curves. In one embodiment, calculating the length of the discontinuity of the transmission line includes identifying a third derivative curve from the third derivative curves that has a minimum peak-to-peak amplitude in the location of the discontinuity, wherein the length of the discontinuity is calculated based on a delay associated with the identified third derivative curve. In one embodiment, the length of the discontinuity is calculated by dividing the associated delay of the identified third derivative curve by two and multiplying it by the propagation velocity of the first pulse. In exemplary embodiments, a trained machine learning system is configured to identify the third derivative curve from the third derivative curves that has the minimum peak-to-peak amplitude in the location of the discontinuity. At block 910, the method 900 includes creating a notification indicating a location and the length of the discontinuity of the transmission line.

Figure 10:
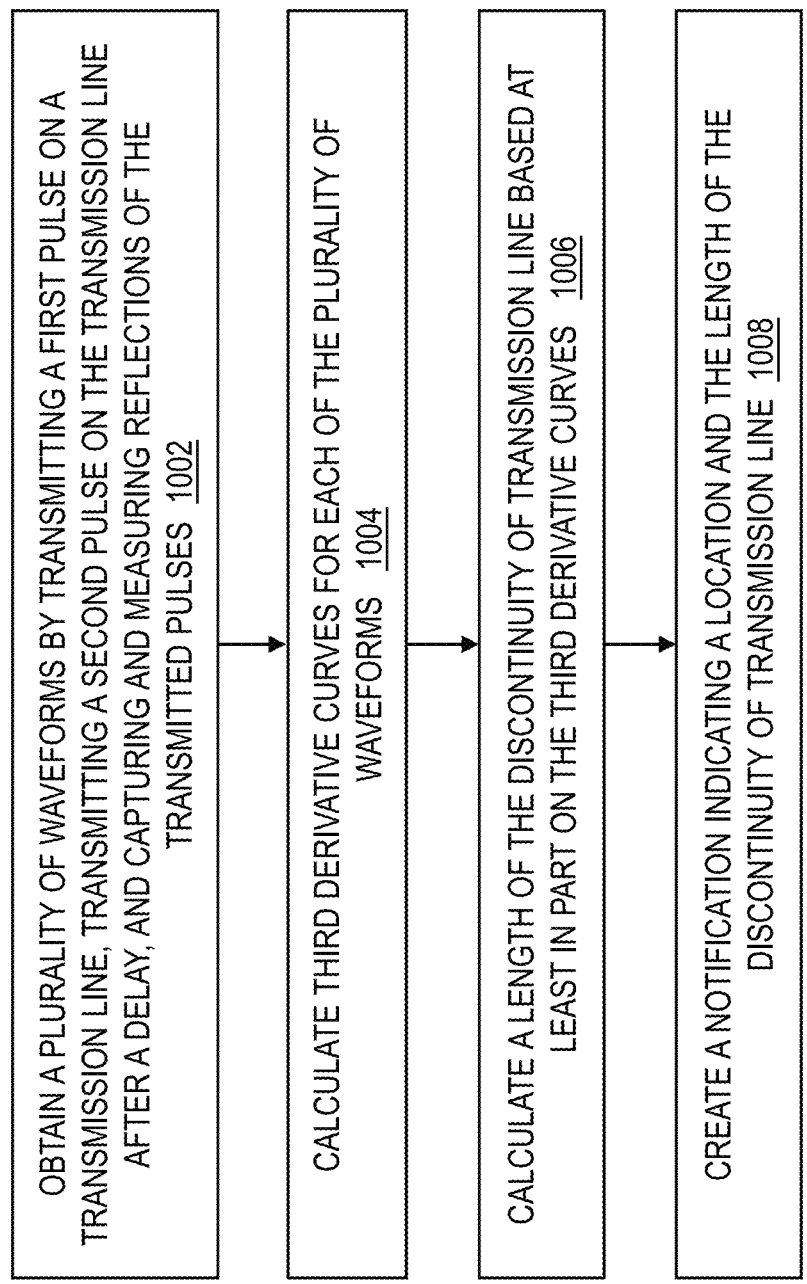
FIG. 10 depicts a flowchart of a method for performing enhanced resolution time domain reflectometry in accordance with one or more embodiments of the present disclosure.

Referring now to FIG. 10, a flowchart of a method 1000 for performing enhanced resolution time domain reflectometry in accordance with one or more embodiments of the present disclosure is shown. In exemplary embodiments, the method 1000 is performed by a time-domain reflectometer such as the one shown in FIG. 3

At block 1002, the method 1000 includes obtaining a plurality of waveforms by transmitting a first pulse on a transmission line, transmitting a second pulse on the transmission line after a delay, and capturing and measuring reflections of the transmitted pulses. In exemplary embodiments, each of the plurality of waveforms corresponds to a different delay value selected from a range of values for the delay. The range of the delay values is specified by a user of the time-domain reflectometer. In exemplary embodiments, the user may also specify a step size of the delay values that will be tested. In one embodiment, the delay values between the transmitted pulses are digitally controlled by the time-domain reflectometer. In another embodiment, the time-domain reflectometer may use analog devices to control delay values between the transmitted pulses.

At block 1004, the method 1000 includes calculating third derivative curves for each of the plurality of waveforms. Next, at block 1006 the method 1000 includes calculating a length of the discontinuity of the transmission line based at least in part on the third derivative curves. In one embodiment, calculating the length of the discontinuity of the transmission line includes identifying a third derivative curve from the third derivative curves that has a minimum peak-to-peak amplitude in the location of the discontinuity, wherein the length of the discontinuity is calculated based on a delay associated with the identified third derivative curve. In one embodiment, the length of the discontinuity is calculated by dividing the associated delay of the identified third derivative curve by two and multiplying it by the propagation velocity of the first pulse. The method 1000 also includes creating a notification indicating a location and the length of the discontinuity of the transmission line, as shown at block 1008.

Although the methods 900 and 1000 shown in FIGS. 9 and 10, respectively, illustrate embodiments in which the length of the discontinuity of transmission line is calculated based at least in part on the third derivative curves, the present disclosure is not intended to be limited to relying on third derivative curves to calculate the length of the discontinuity of transmission line. Rather, one or more of first derivative curves and second derivative curves of the plurality of waveforms can also be used to calculate the length of the discontinuity of transmission line.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for performing enhanced resolution time-domain reflectometry, comprising:
    obtaining a plurality of waveforms, wherein each of the plurality of waveforms are obtained by:
        transmitting a first pulse on a transmission line;
        transmitting a second pulse on the transmission line, where the second pulse is transmitted after the first pulse by a delay; and
        capturing and measuring reflections of the transmitted pulses, wherein the delay corresponding to each of the plurality of waveforms is different;
    identifying a discontinuity of the transmission line based at least in part on the plurality of waveforms;
    based on a determination that the transmission line includes the discontinuity:
        calculating third derivative curves for each of the plurality of waveforms; and
        calculating a length of the discontinuity of the transmission line based at least in part on the third derivative curves; and
        creating a notification indicating a location and the length of the discontinuity of the transmission line, wherein calculating the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

2. The method of claim 1, wherein the plurality of waveforms correspond to a range of values for the delay, wherein the range is specified by a user.

3. The method of claim 2, wherein the value for the delay is digitally controlled.

4. The method of claim 1, wherein the determination that the transmission line includes the discontinuity is based on determining that the plurality of waveforms have a point at which the waveforms transition from flat to having a positive slope.

5. The method of claim 1, wherein the length of the discontinuity is calculated by dividing the associated delay of the identified third derivative curve by two and multiplying it by a propagation velocity of the first pulse.

6. The method of claim 1, wherein a trained machine learning system is configured to identify the third derivative curve from the third derivative curves that has the minimum peak-to-peak amplitude in the location of the discontinuity.

7. A computing system having a memory having computer readable instructions and one or more processors for executing the computer readable instructions, the computer readable instructions controlling the one or more processors to perform operations comprising:
obtaining a plurality of waveforms, wherein each of the plurality of waveforms are obtained by:
transmitting a first pulse on a transmission line;
transmitting a second pulse on the transmission line, where the second pulse is transmitted after the first pulse by a delay; and
capturing and measuring reflections of the transmitted pulses, wherein the delay corresponding to each of the plurality of waveforms is different;
identifying a discontinuity of the transmission line based at least in part on the plurality of waveforms;
based on a determination that the transmission line includes the discontinuity:
calculating third derivative curves for each of the plurality of waveforms; and
calculating a length of the discontinuity of the transmission line based at least in part on the third derivative curves; and
creating a notification indicating a location and the length of the discontinuity of the transmission line, wherein calculating the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

8. The computing system of claim 7, wherein the plurality of waveforms correspond to a range of values for the delay, wherein the range is specified by a user.

9. The computing system of claim 8, wherein the value for the delay is digitally controlled.

10. The computing system of claim 8, wherein the determination that the transmission line includes the discontinuity is based on determining that the plurality of waveforms have a point at which the waveforms transition from flat to having a positive slope.

11. The computing system of claim 7, wherein the length of the discontinuity is calculated by dividing the associated delay of the identified third derivative curve by two and multiplying it by a propagation velocity of the first pulse.

12. The computing system of claim 7, wherein a trained machine learning system is configured to identify the third derivative curve from the third derivative curves that has the minimum peak-to-peak amplitude in the location of the discontinuity.

13. A computer program product comprising a non-transitory computer readable storage medium having program instructions embodied therewith, the program instructions executable by a processor to cause the processor to perform operations comprising:
obtaining a plurality of waveforms, wherein each of the plurality of waveforms are obtained by:
transmitting a first pulse on a transmission line;
transmitting a second pulse on the transmission line, where the second pulse is transmitted after the first pulse by a delay; and
capturing and measuring reflections of the transmitted pulses, wherein the delay corresponding to each of the plurality of waveforms is different;
identifying a discontinuity of the transmission line based at least in part on the plurality of waveforms;
based on a determination that the transmission line includes the discontinuity:
calculating third derivative curves for each of the plurality of waveforms; and
calculating a length of the discontinuity of the transmission line based at least in part on the third derivative curves; and
creating a notification indicating a location and the length of the discontinuity of the transmission line, wherein calculating the length of the discontinuity of the transmission line includes identifying a third derivative curve from the third derivative curves that has a minimum peak-to-peak amplitude in the location of the discontinuity, wherein the length of the discontinuity is calculated based on an associated delay of the identified third derivative curve.

14. The computer program product of claim 13, wherein the length of the discontinuity is calculated by dividing the associated delay of the identified third derivative curve by two and multiplying it by a propagation velocity of the first pulse.

15. The computer program product of claim 13, wherein a trained machine learning system is configured to identify the third derivative curve from the third derivative curves that has the minimum peak-to-peak amplitude in the location of the discontinuity.

16. A method for performing enhanced resolution time-domain reflectometry, comprising:
obtaining a plurality of waveforms, wherein each of the plurality of waveforms are obtained by:
transmitting a first pulse on a transmission line;
transmitting a second pulse on the transmission line, where the second pulse is transmitted after the first pulse by a delay; and
capturing and measuring reflections of the transmitted pulses, wherein the delay corresponding to each of the plurality of waveforms is different;
calculating derivative curves for each of the plurality of waveforms;
calculating a length of a discontinuity of the transmission line based at least in part on the derivative curves; and
creating a notification indicating a location and the length of the discontinuity of the transmission line, wherein calculating the length of the discontinuity of the transmission line includes identifying at least one derivative curve from the derivative curves that has a minimum peak-to-peak amplitude in a location of the discontinuity, wherein the length of the discontinuity is calculated based on an associated delay of the identified at least one derivative curve.

17. The method of claim 16, wherein the derivative curves comprise third derivative curves.

18. A method for performing enhanced resolution time-domain reflectometry, comprising:
a) transmitting a first pulse on a transmission line;
b) transmitting a second pulse on the transmission line, where the second pulse is transmitted after the first pulse by a delay;
c) capturing and measuring reflections of the transmitted pulses to create a waveform;
iteratively repeating steps a, b, and c using a plurality of different values for the delay to create a plurality of waveforms including the waveform;
identifying a discontinuity of the transmission line based at least in part on the plurality of waveforms;

based on a determination that the transmission line includes the discontinuity:
  calculating third derivative curves for each of the plurality of waveforms; and
  calculating a length of the discontinuity of the transmission line based at least in part on the third derivative curves; and
creating a notification indicating a location and the length of the discontinuity of the transmission line, wherein calculating the length of the discontinuity of the transmission line includes identifying a third derivative curve from the third derivative curves that has a minimum peak-to-peak amplitude in a location of the discontinuity, wherein the length of the discontinuity is calculated based on an associated delay of the identified third derivative curve.

19. The method of claim 18, wherein the determination that the transmission line includes the discontinuity is based on determining that the plurality of waveforms have a point at which the waveforms transition from flat to having a positive slope.

20. The method of claim 18, wherein the length of the discontinuity is calculated by dividing the associated delay of the identified third derivative curve by two and multiplying it by a propagation velocity of the first pulse.

21. The method of claim 18, wherein a trained machine learning system is configured to identify the third derivative curve from the third derivative curves that has the minimum peak-to-peak amplitude in the location of the discontinuity.

* * * * *